3,493,651
PRODUCTION OF VIRAL VACCINES
Nathan H. Sloane, Germantown, Tenn., assignor to Century Laboratories, Inc., a corporation of Delaware
No Drawing. Filed Mar. 9, 1967, Ser. No. 621,759
Int. Cl. A61k 23/00; C12k 5/00
U.S. Cl. 424—89                                                    1 Claim

ABSTRACT OF THE DISCLOSURE

A synthetic cellulosic sponge, which is substantially free of proteinaceous material and other contaminants, is an excellent tissue culture support for the growth of free tissue cells. The cellulosic sponge, which has been extracted of all proteinaceous material, is saturated with a suspension of free tissue cells in nutrient medium and incubated at a predetermined temperature. After a sufficient quantity of cells has been grown, they are inoculated with a virus which is grown in the cells. The virus is later collected and used to produce vaccines.

BACKGROUND OF THE INVENTION

Field of the invention

This invention relates to a method for the production of vaccines from virus grown in a tissue culture which is substantially free of extraneous protein and other contaminants. More particularly, the tissue culture compromises a nutrient medium suspension of free tissue cells which are grown in a protein-free synthetic cellulosic sponge support. The sponge support provides a very large surface area per given volume for the attachment and growth of the cells which permits the production of large quantities of virus which can then be collected and used in the production of vaccines.

Description of the prior art

The term "tissue culture," as used herein, refers to the cultivation and proliferation of free tissue cells in a system entirely apart from their normal environment and in which the conditions and factors for growth can be varied at will within the boundaries tolerated by the cell. Live viruses, from which viral vaccines are produced, can be synthesized and grown only in living cells. Tissue culture, therefore, offers a method by which large numbers of living cells can be grown from a single inoculum of cells derived from a source most suitable to a particular problem. With the production of large numbers of cells, great amounts of viruses, necessary for the production in quantity of vaccines, can be produced.

As is well known, before the growth of living cells will occur, some type of surface must be available for attachment of the cells. Various support surfaces such as perforated cellophane sheets, glass beads, glass helices and even plain glass surfaces have been used in tissue culture. None of these supports provides the large surface area per volume that is needed for the production of large quantities of cells. Furthermore, these supports do not have the adherent properties that are most effective for the propagation of the cells, nor do they provide the resiliency which, by experience, appears to be most important for such propagation.

Prior to this invention, tissue culture methods have also included the use of tissue substrates such as fibrin clots on a support medium, and, in particular, a sponge-plasma clot combination. The sponge-plasma clot support is formed by allowing blood plasma to be absorbed in and form a clot in the sponge. Small pieces of whole tissue are then implanted in the plasma clot which acts as an anchor to make the tissue stick to the sponge. However, the sponge-plasma clot support is not entirely satisfactory for the production of vaccines. For example, the action of proteolytic enzymes in the tissue cells on the plasma results in the continuous liberation of foreign protein into the vaccine precursor. The use of plasma in itself has many disadvantages: it clouds up and becomes opaque, making microscopic examination of the cells difficult; it can liquefy or dissolve the culture; the cells embedded in the clot cannot be separated quantitatively for subsequent examination and analysis; and the analysis of the new tissue or cell growth is of questionable accuracy because of the chemical nature of the clot.

Heretofore, it has not been thought possible to use a sponge alone, without a plasma clot, as a tissue culture support. This belief was fostered because of the necessity for an "anchoring" mechanism by which the free tissue cells could establish themselves on the support before growth would occur. This invention provides a sponge tissue culture support which does not require the inclusion of a plasma clot and which provides both a large surface area and the adherent properties that are necessary for the growth of free tissue cells.

SUMMARY OF THE INVENTION

According to the present invention, free tissue cells can be efficiently grown on a synthetic cellulosic sponge, in contrast to other sponge material such as vinyl sponge, and in contrast to other supports such as perforated cellophane sheets, glass beads etc. The synthetic cellulose sponge is substantially free of protein and other contaminants, that is, the sponge is cleaned and washed to remove any contaminant which would interfere with cell proliferation. The sponge is also devoid of blood clot or other extraneous proteinaceous material. The cellulose sponge, which serves as a tissue culture support and provides an "anchoring" means for the cells, is thoroughly extracted of protein and other contaminants and sterilized before being saturated with a suspension of free tissue cells in a nutrient medium. The tissue culture and support are then incubated at a predetermined temperature to promote the growth of the cells. From time to time the culture and substrate is washed to eliminate spent medium and fresh nutrient medium is added. After sufficient cell growth is obtained, the culture is then inoculated with a virus and further incubated to promote the growth of the virus. After sufficient virus is produced, it is then recovered for use in the production of vaccine.

DESCRIPTION OF THE PREFERRED EMBODIMENTS

A cellulose sponge has been found to be extremely effective as a support for tissue cell growth in the method of this invention (Table I). The cellulosic sponges are elastic and porous, absorbent, and of an open, loose pliable texture which is of importance in tissue supports. The pores in cellulose sponges vary from the "standard pore" (approximately ½ inch) to "fine pore" (about pinhead size).

To facilitate handling of the sponge, it is cut into strips about 1 inch wide by 5 inches long by ½ inch thick. These dimensions are not critical so far as the propagation of the cells is concerned, the only limiting factor in the size of the sponge being the requirement for ease of handling.

Since the tissue cell propagation must take place under sterile conditions, the sponge should be carefully cleaned and sterilized before it is used in this procedure. After the sponge has been properly prepared for use, it is placed in a suitable vessel and saturated with a prepared nutrient medium. A tissue cell suspension in nutrient medium is then placed on the sponge and more nutrient medium is added if necessary. The tissue cell culture is then incubated at a predetermined temperature for a suitable period of time, during which time cell growth takes place. During the period of incubation the cells, in the ordinary course of metabolic activity, attach themselves to the sponge. The cell culture is periodically washed during incubation and fresh nutrient medium is added to replace the spent medium.

Once the tissue cells have established themselves in the sponge support, the nutrient medium fluid is drawn off and replaced with fresh nutrient. The cell culture is then inoculated with a particular virus, the choice of which depends upon the vaccine which one desires to produce. During incubation, the virus multiplies in the tissue cells, until the cells, as a result of internal pressure caused by the virus, burst and release virus particles. The released virus then secondarily infects new tissue cells and further growth of virus occurs.

The amount of virus which has been produced in the tissue culture may be determined by any one of several procedures. Sufficient viral growth usually causes an observable change in the cells, termed "cytopathogenic effect." But, if as sometimes happens, a particular cell culture does not exhibit a cytopathogenic effect, the quantity of virus produced in the culture may be assessed by alternative methods such as serological procedures or lethal dose measurements.

Following recovery of the virus, the viral vaccines may be produced by methods which are well known in the art. For example, adenovirus can be grown, recovered and made into a vaccine by formalization. Many other types of viruses can be grown and recovered by the method of this invention, as for example, polio virus, ECHO, coxsacki viruses and canine hepatitis virus.

The types of tissue cells upon which the viruses will grow vary: for example, primary trypsinized monkey kidney cells will grow polio viruses, adenoviruses, JH virus and influenza viruses. Other well known tissue cells are used to grow various other viruses.

EXAMPLE

A commercially available cellulose sponge manufactured by the Du Pont Company was washed by hand with deionized water, the sponge being squeezed in running water until all the soapy material was removed. The sponge was then squeezed dry and immersed in a solution of 95% ethyl alcohol. The sponge was frequently removed from the alcohol and washed in deionized water with frequent squeezing to remove any protein or oily material in the sponge. This procedure was repeated every three hours over two working days. After the final alcohol washing, the sponge was placed in a clean enamel pail which was filled with deionized water and brought to a boil. The sponge was boiled for one-half hour, then turned and boiled again for one-half hour. The hot water was then poured off and the sponge removed, squeezed dry, and replaced in the pail which had been wiped clean and rinsed four times in deionized water. This procedure was repeated three additional times (a total of four water washings) until the sponge was free of oil.

The prepared sponges were air dried on high quality gauze and handled with a clean stainless steel forceps. The sponge was then cut with a clean scalpel blade into 4-inch strips about 1-inch wide by 1-inch thick. The sponge strips were placed into Roux flasks and sterilized at 121° C. for one hour and then dried at 110° C. for a short time.

The media used as a nutrient for the cells vary considerably, but, in general, a suitable composition must supply nutrients which the cell would have available to it in the animal organism; therefore, all media have compositions which closely approach that of blood serum. The only difference is that in artificial media the concentrations of the components are higher than those found in body fluids because the cells must have a continuous supply of nutrients over a period of time. Various nutrient media such as that described by Morgan, Morton and Parker in Proc. Soc. Exp. Biol. and Med., vol. 73, p. 1 (1950) (the nutrient medium used herein) and others, such as supplemented lactalbumin hydrolysate, may be used in the method of this invention.

Trypsinized monkey kidney cells prepared from rhesus or cynomologous monkeys as described by Dulbecco and Vogt, Jour. Exp. Med., vol. 99, pp. 167–182 (1954) and Rappaport, Bull. World Health Org., vol. 14, pp. 147–166 (1956) are suspended in the nutrient medium.

The cell suspension was added to the Roux flasks which contained four strips of sponge. The flasks were gently shaken and then incubated at 37° C. without further disturbance for five days. At the end of this period the sponges were removed with forceps, washed, and a protein determination and a growth curve made. The nutrient medium was changed at this time.

A comparison of the effectiveness of various cell substrates under growth conditions substantially as described above is shown in Table I. The superiority of the cellulose sponge support as a cell substrate is clearly shown therein.

TABLE I

| Substrate | Mg. Cell Protein | |
|---|---|---|
| | Inoculum | 5 Day Incubation |
| Vinyl sponge* (General Mills) | 1.24 | 3.00 |
| Vinyl sponge* (Simonize) | 1.24 | 4.20 |
| Glass | 1.24 | 8.50 |
| Cellulose sponge* (Du Pont) | 1.24 | 9.92 |

* Flask contained four strips of sponge 4″ x 1″ x ½″.

The monkey kidney tissue cell culture grown on the cellulose sponge was washed and fresh nutrient added. The cell culture was then inoculated with Type 3 adenovirus and incubated at 37° C. After five days incubation a complement-fixation (CF) antigen titer of 1:4 was obtained while after eight days incubation a CF titer of 1:16 was obtained. A CF titer of 1:16 separates a titer of approximately $10^6$ tissue culture infecting doses. A CF titer of 1:2 is acceptable for the production of vaccine. Vaccine made with this material by Formalin treatment of the solution elicited a high immunogenic response in rabbits. Such rabbit sera, when diluted to 1:160 protected the cells in tissue culture from infection.

I claim:
1. A method for the production of vaccines from virus grown in a tissue culture which comprises propagating free tissue cells in a nutrient medium saturated in a culture support, said culture support comprising a synthetic cellulosic sponge which has pores which may be from approximately one-half inch to pinhead size, which sponge is washed and pre-sterilized and which is essentially free of protein other than that which is contained in the tissue cells or nutrient medium, said free cells having attached and established themselves in the sponge in the ordinary course of metabolic activity during a suitable period of incubation at a predetermined temperature, thereafter drawing off the nutrient medium fluid and periodically adding fresh nutrient in an amount and at a frequency as determined necessary to produce sufficient cell growth, inoculating the tissue cells with a virus and growing said virus therein until the cells burst and release virus par- ticles as a result of internal pressure caused by multiplication of the virus said released virus then being capable of secondarily infecting new tissue cells with the occurrence of further virus growth, and recovering the virus after it has grown sufficiently to cause an observable cytopathogenic effect and an acceptable complement-fixation antigen titer is obtained in an amount sufficient to produce a vaccine therefrom.

References Cited

UNITED STATES PATENTS 2,658,021 11/1953 Earle et al. ---------- 195—1.8

2,761,813 9/1956 Goetz -------------- 195—116
2,970,088 1/1961 Freeman ------------ 195—139
2,990,335 6/1961 Earle et al. ---------- 195—1.8
2,996,429 8/1961 Toulmin ------------ 195—1.7

SHEP K. ROSE, Primary Examiner

U.S. Cl. X.R.

195—1.1, 1.7, 1.8, 100, 116